Sept. 24, 1968    A. R. HUTSON    3,402,980
GAS LENS USING TWO GASES HAVING UNEQUAL REFRACTIVE INDICES
Filed Aug. 19, 1964
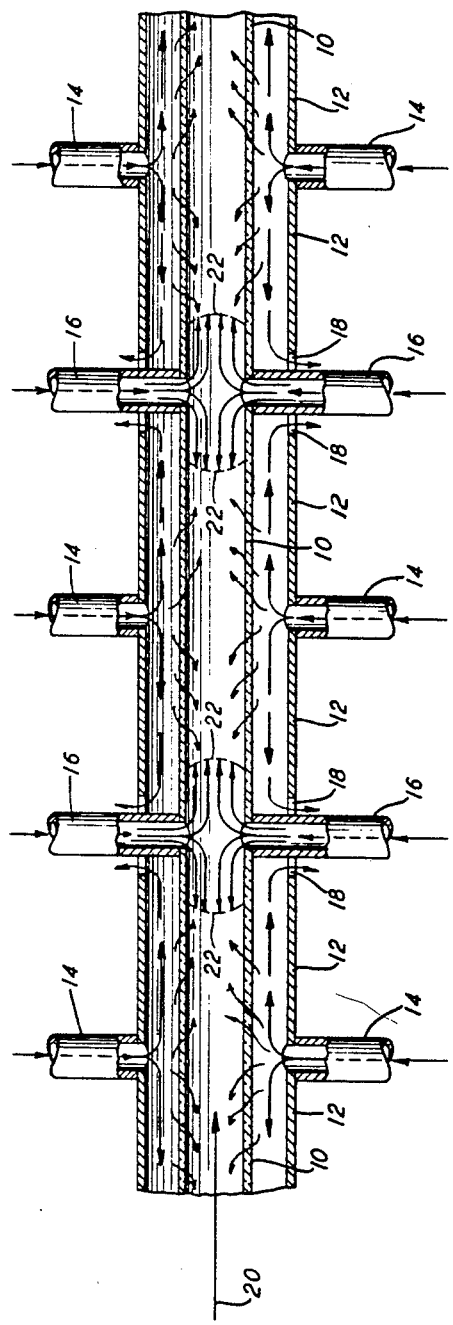
INVENTOR
A. R. HUTSON
BY H. O. Wright
ATTORNEY United States Patent Office 3,402,980
Patented Sept. 24, 1968

3,402,980
GAS LENS USING TWO GASES HAVING UNEQUAL REFRACTIVE INDICES
Andrew R. Hutson, Summit, N.J., assignor to Bell Telephone Laboratories, Incorporated, New York, N.Y., a corporation of New York
Filed Aug. 19, 1964, Ser. No. 390,659
4 Claims. (Cl. 350—179)

ABSTRACT OF THE DISCLOSURE

This application discloses a gas lens in which focusing action is produced by the use of two transparent gases having unequal refractive indices. The structure comprises an inner, porous conduit, which provides an enclosed path for an electromagnetic beam, surrounded by an outer, non-porous conduit. One of the gases is introduced directly into the inner conduit by means of a set of ports. The second gas is introduced between the conduits, and enters the inner conduit through its porous wall. The resulting curved interface formed between the two gases in the inner conduit produces a focusing effect upon the beam.

---

This invention relates to the long distance transmission of beams of ultrahigh frequency electromagnetic wave energy through guiding conduits. More particularly, it relates to novel means for substantially eliminating spreading and scattering of the rays of such beams.

The present invention is related to applicant's joint application with A. C. Beck and G. E. Conklin, Ser. No. 379,112, filed June 30, 1964, and an application Ser. No. 353,689, filed Mar. 23, 1964, by D. W. Berreman, both of which are assigned to applicant's assignee.

Like an arrangement proposed in said joint application, the arrangement of the present application is directed to a gaseous lens employing two transparent gases having substantially differing refractive indices, but whereas in the arrangement of the joint application a laminar flow of the gas of larger refractive index is directed along the entire length of the beam guiding conduit, in the arrangement of the present application the gas of larger refractive index is injected at each point at which it is desired to form a gaseous lens. While this latter feature resembles in some degree a feature of the Berreman application mentioned above, the structural arrangements of the present application are distinctly different and are believed to afford greater stability. Numerous other differences will become apparent from a perusal of the following detailed description of an illustrative arrangement of the invention.

A principal object of the invention is to facilitate the focusing of a beam of ultrahigh frequency electromagnetic wave energy being transmitted along a conduit to substantially eliminate spreading and scattering of the rays of the beam.

Other and further objects, features and advantages will become apparent from a perusal of the following specification and the appended claims in conjunction with the accompanying drawing in the sole figure of which an illustrative arrangement of the invention is shown in diagrammatic form.

In more detail in the figure of the drawing, a conduit 10 along the longitudinal axis of which a laser beam 20 or the like is to be transmitted is shown. Conduit 10 is porous to both of the gases to be employed in forming the gaseous lenses, one gas being of a relatively high or large index of refraction and the other of a relatively low or small index of refraction. The gas of higher refractive index may, for example, be carbon dioxide, methane or the like. The gas of smaller refractive index may be helium, neon, hydrogen, argon or the like.

At intervals along conduit 10, a group or set of two or more input ports 16, symmetrically arranged around the conduit, are provided for the purpose of injecting the gas of the larger index of refraction into the conduit 10.

Sections of a second larger conduit 12 which are impervious to both gases are concentrically arranged with respect to conduit 10 as shown. Substantially midway between consecutive sets of input ports 16, corresponding sets of input ports 14 into conduit 12 are provided as shown, and adjacent each set of input ports 16, outlets 18 are provided in conduit 12 as shown.

In operation, an excess of the gas of smaller index of refraction is injected into ports 14 much of which follows the paths indicated by arrows leading from ports 14 to outlets 18 and serves to flush gas of the larger index of refraction which may pass through the inner porous conduit 10 into conduit 12.

The gas of the smaller index of refraction also passes through and into the porous central conduit 10 particularly at and adjacent to the ports 14 through which it is injected into conduit 12. For the "steady-state" condition, the gas of smaller index substantially fills the porous central conduit 10 throughout a large portion of each interval between successive ports 16, and there is little, if any, further flow of the gas of smaller index into central conduit 10 while a specific steady-state condition is maintained.

Adjacent each set of input ports 16 to the center conduit 10 there will be substantially only gas of the larger refractive index while as mentioned above the gas of smaller refractive index will substantially fill the remainder of the inner conduit 10. This results in the formation of interfaces 22 in conduit 10 on each side of each set of input ports 16 between the gas of larger refractive index and the gas of smaller refractive index. By suitable adjustment of the relative pressures of the two gases, these interfaces may be made to bulge away from each set of input ports 16, as shown by the arrows and broken lines 22 in conduit 10, thus forming a converging gaseous lens at each set of input ports 16. If a divergent focusing effect is desired, the relative pressures of the two gases effective at interfaces 22 can of course be reversed to reverse the curvature of the interfaces, or the gas of smaller refractive index may be injected through ports 16 and that of larger refractive index injected through ports 14. Divergent focusing effects are, of course, employed in "alternating gradient focusing" arrangements as discussed, for example, in the copending application of D. W. Berreman and S. E. Miller, Ser. No. 379,175, filed June 30, 1964, and assigned to applicant's assignee.

A short time after the two gases have been injected into their respective input ports and their respective pressures adjusted to provide the desired kind and degree of focusing, a "steady-state" condition will be reached at which time interfaces 22 will remain substantially fixed and only relatively small additional amounts of the two gases will be required to maintain a stable condition.

The degree of the focusing effect obtained can, obviously, be adjusted by adjusting the gas pressures of one or both gases thus effecting changes in the curvature of the interfaces 22.

The excess of the smaller refractive index gas injected, as illustrated in the drawing, through ports 14 together with a relatively small amount of the larger refractive index gas that passes through porous conduit 10 into conduit 12 will be ejected through outlets 18 and may be recovered. The recovered gases may of course subsequently be separated by conventional means, not shown, and again injected into the respective appropriate ports.

Numerous and varied other arrangements within the spirit and scope of the principles of the invention will readily occur to those skilled in the art. The above embodiment while illustrative of one manner of implementing the inventive concept should be understood to in no way impose limitations on the application of the inventive principles.

What is claimed is:

1. A gaseous lens system, employing two transparent gases having unequal refractive indices to guide a beam of electromagnetic wave energy, comprising:
   an inner conduit providing an enclosed path for said beam;
   said inner conduit being porous to both said gases and having a set of input ports longitudinally distributed therealong through which the first gas of larger refractive index is introduced directly into said inner conduit;
   an outer conduit, impervious to both said gases, surrounding said inner conduit;
   said outer conduit having:
      a first set of ports, each of which is located adjacent to a port of said set of input ports, for exhausting gas from within said system;
      and a second set of ports longitudinally distributed along said outer conduit between said input ports for introducing an excess of the gas of smaller refractive index into said outer conduit, whereby the gas of smaller refractive index, after passing through the porous wall of said inner conduit, forms a curved interface with the gas of larger refractive index to produce a focusing effect.

2. A structure for forming a gaseous lens by the combined use of a first transparent gas of a first refractive index and a second transparent gas of a second refractive index differing appreciably from said first refractive index, comprising:
   an inner conduit providing an enclosed path for a beam of electromagnetic wave energy;
   said inner conduit being substantially porous to both said gases;
   a set of input ports symmetrically distributed around an intermediate position along said inner conduit for introducing one of said gases directly into said conduit;
   an outer conduit impervious to both said gases enclosing said first conduit;
   said outer conduit having:
      a first set of outlet ports adjacent to said set of input ports for exhausting gas from said structure;
      and a second set of ports displaced relative to said input ports symmetrically distributed about said second conduit for introducing an excess of the other of said gases into said second conduit, whereby the other of said gases, after passing through the porous wall of said first conduit, forms a curved interface with said first gas in said first conduit to produce a focusing effect.

3. The structure of claim 1 in which the gases are carbon dioxide and helium, respectively.

4. The structure of claim 1 in which the gases are methane and argon, respectively.

No references cited.

JOHN K. CORBIN, *Primary Examiner.*